Aug. 2, 1927.　　　　　　　　　　　　　　　　　　　1,637,756
C. A. STICKNEY ET AL
METHOD AND MEANS FOR MAINTAINING A PREDETERMINED TEMPERATURE
Filed Oct. 29, 1925　　　　　5 Sheets-Sheet 1
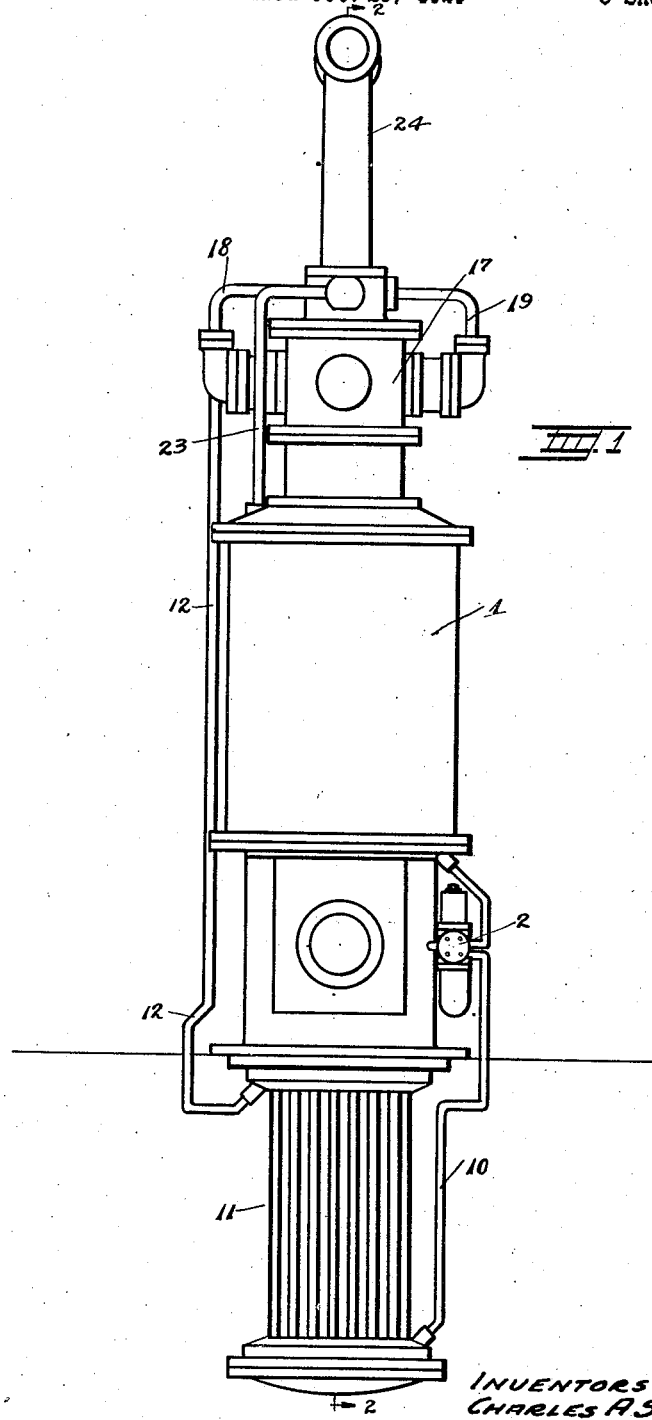
INVENTORS
CHARLES A STICKNEY
ALPHEUS B STICKNEY
BY
ATTORNEY

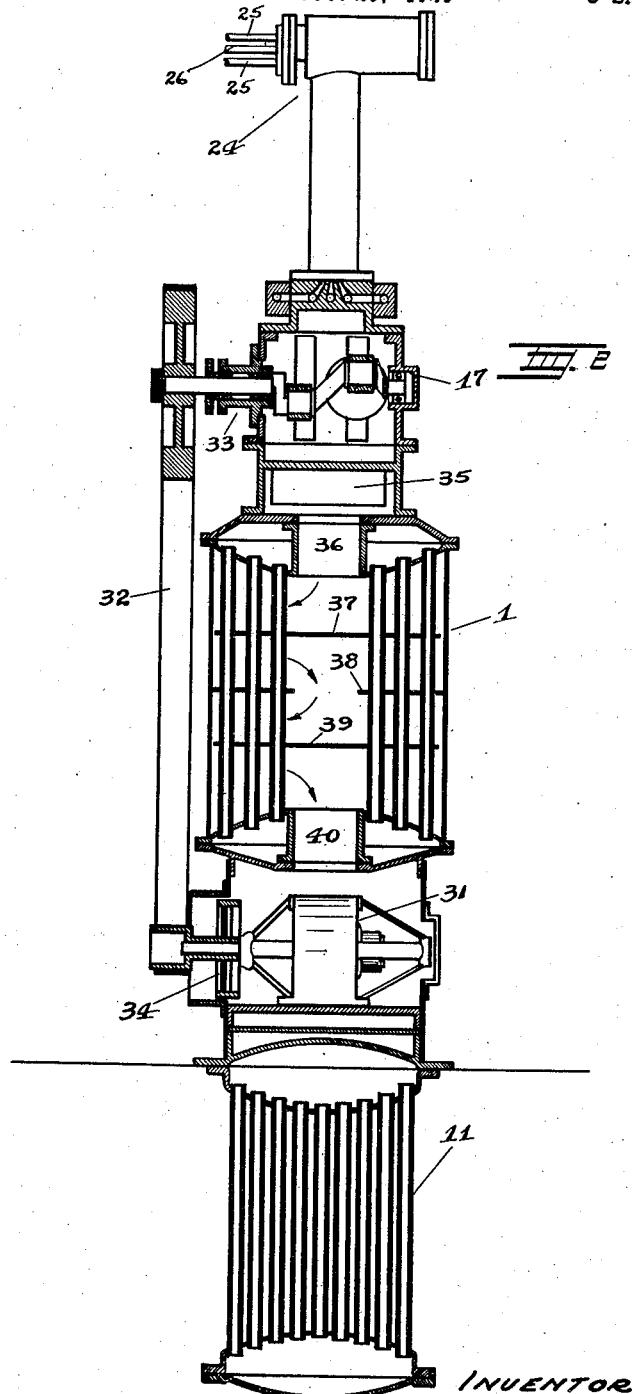

Aug. 2, 1927.  
C. A. STICKNEY ET AL  
1,637,756  
METHOD AND MEANS FOR MAINTAINING A PREDETERMINED TEMPERATURE  
Filed Oct. 29, 1925   5 Sheets-Sheet 3
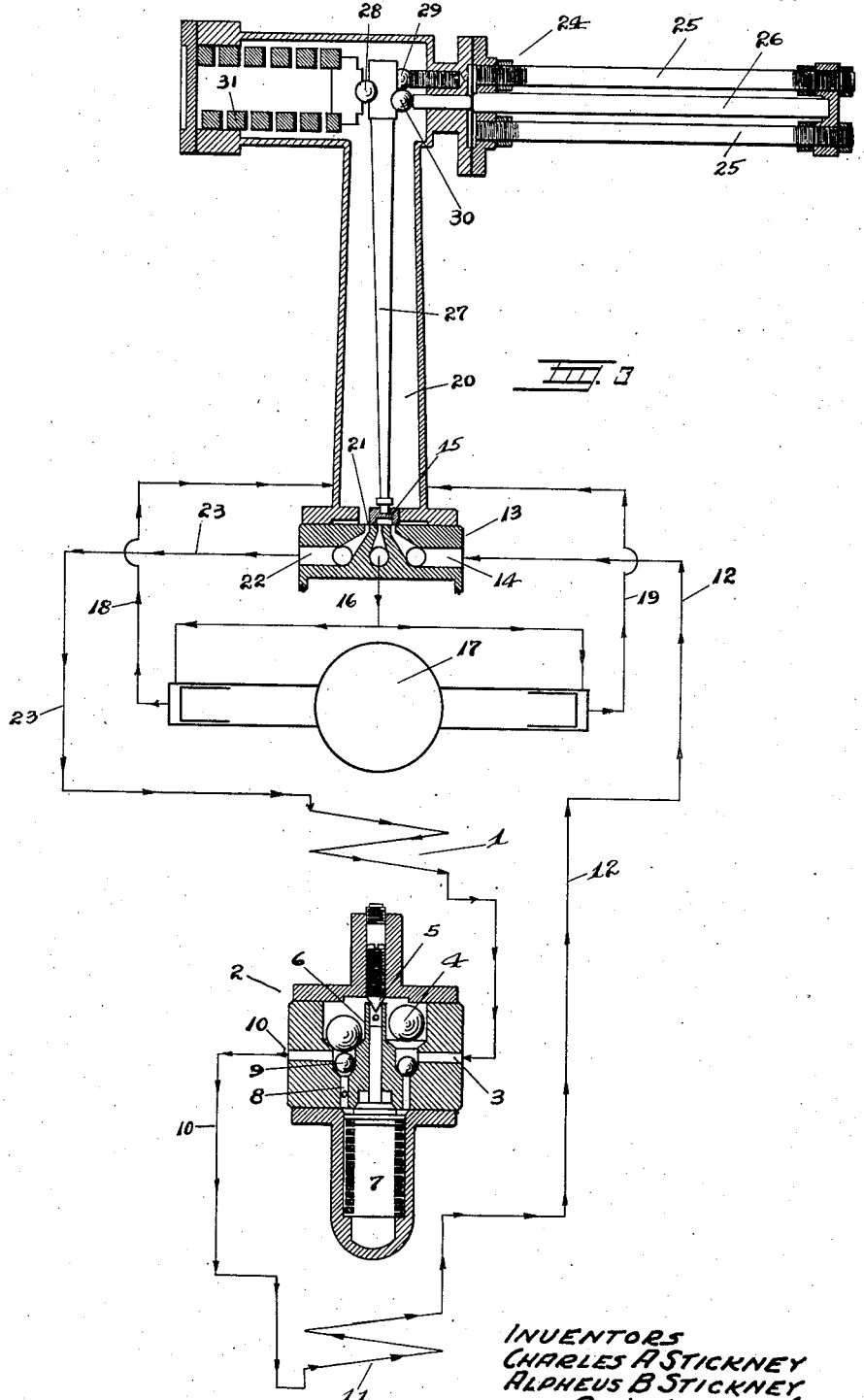
INVENTORS  
CHARLES A STICKNEY  
ALPHEUS B STICKNEY  
By C. F. Enochs  
ATTORNEY Aug. 2, 1927. 1,637,756
C. A. STICKNEY ET AL
METHOD AND MEANS FOR MAINTAINING A PREDETERMINED TEMPERATURE
Filed Oct. 29, 1925 5 Sheets-Sheet 4
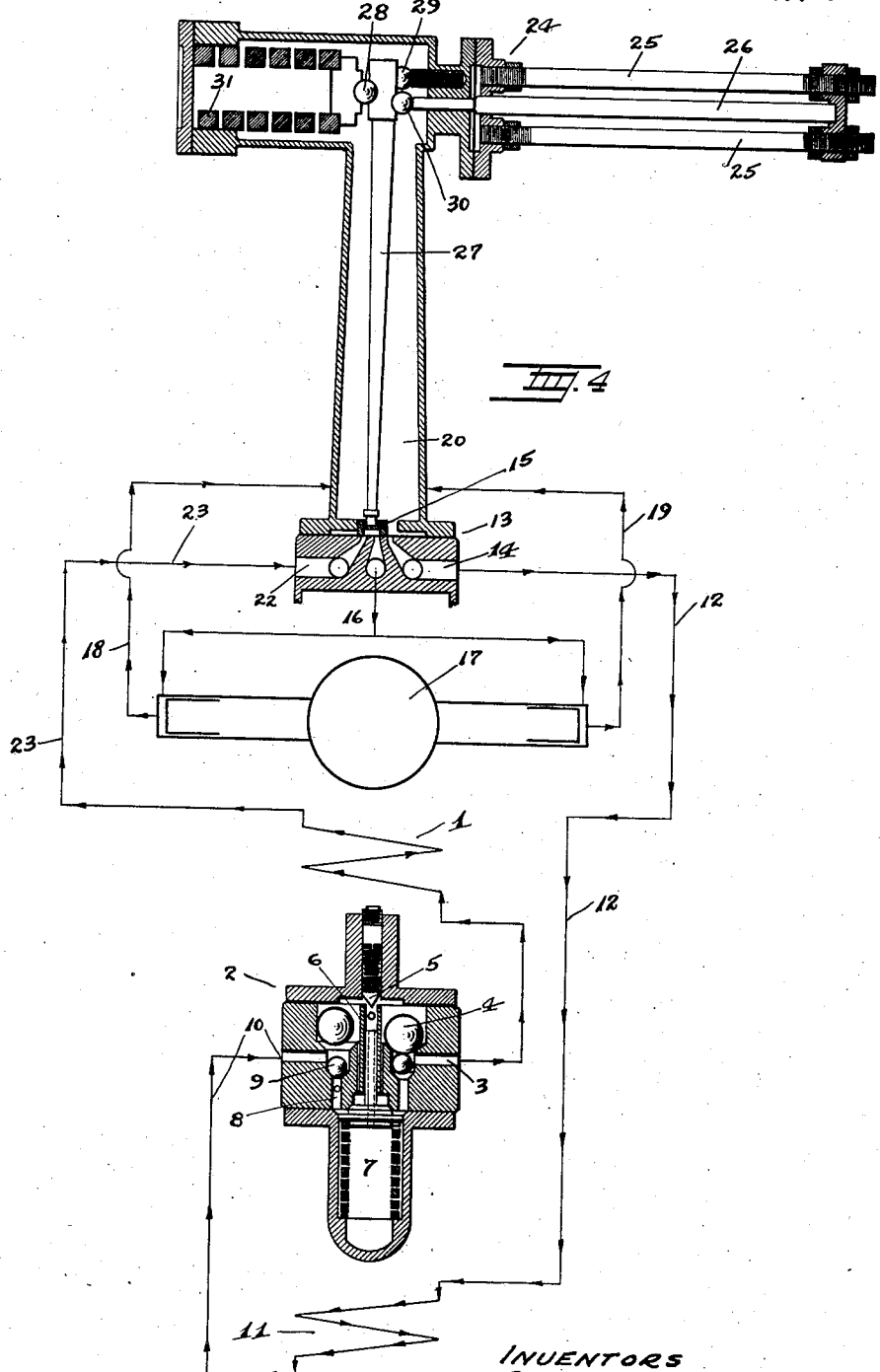
INVENTORS
CHARLES A STICKNEY
ALPHEUS B STICKNEY
BY C A Enochs
ATTORNEY

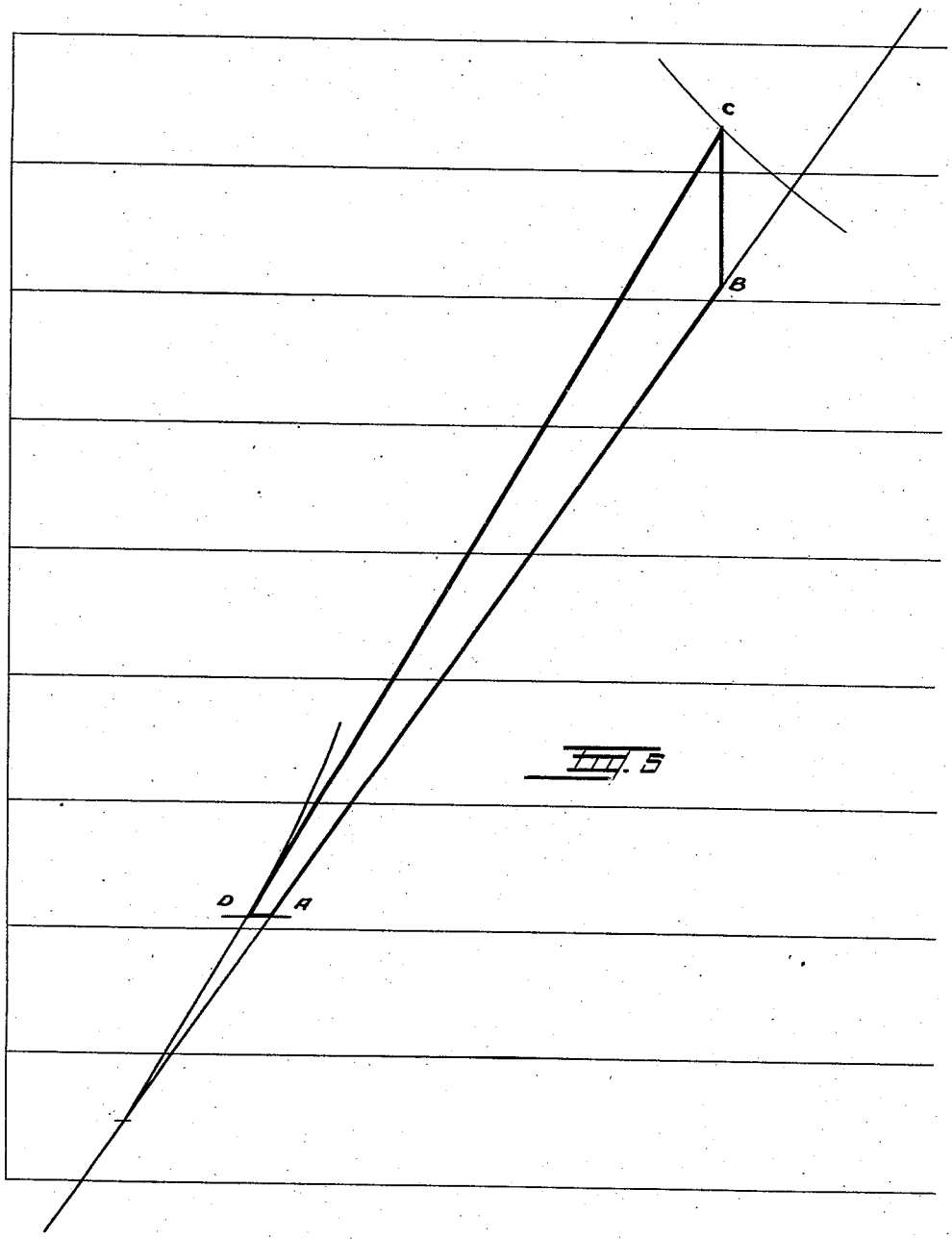

Patented Aug. 2, 1927.

1,637,756

UNITED STATES PATENT OFFICE.

CHARLES A. STICKNEY, OF ROCKFORD, ILLINOIS, AND ALPHEUS B. STICKNEY, OF NEW HAVEN, CONNECTICUT.

METHOD AND MEANS FOR MAINTAINING A PREDETERMINED TEMPERATURE.

Application filed October 29, 1925. Serial No. 65,707.

One object of our invention is to provide a method and means whereby the temperature in a given space may be maintained at approximately the desired temperature, regardless of whether this temperature is below or above that of surrounding mediums.

Another object is to provide method and means whereby low grade heat, from a medium such as air in winter, may be abstracted and utilized to raise the temperature of a second medium whose temperature is higher than that of the first medium.

Another object is to provide means whereby two heat transfer coils may be utilized, with one of them as a hot coil and the other as a cold coil, and vice versa, depending upon the conditions under which the system is operating.

Another object is to provide in combination with two heat transfer coils, a distributing valve and a thermostat, whereby the distributing valve and thermostatic action will determine which of the coils will be the hot coil and which will be the cold coil.

With these and incidental objects in view, the invention consists of certain novel features and combination of parts and novel sequences and combinations of operations, the essential features of which are hereinafter described with reference to the drawings, which accompany and form a part of this specification.

In the drawings, Figure 1 is a side elevation of one embodiment of our invention. Figure 2 is a section taken on the line 2—2, Figure 1; Figure 3 is a diagram showing the manner in which the system functions as a heating system; Figure 4 is a similar diagram showing the manner in which the system functions as a cooling system, and Figure 5 is a chart showing an example of the uses of the heat content entropy diagram for sulphur dioxide, as applied to our improved system.

The fundamental principle used in our method and system, is that of the reversed heat engine, which is, of course, old but we believe we are the first to have produced a practical method and means for reversing the effect of the cycle employed by means of a distributing valve and controlling the distributing valve by a thermostat, so the system would be automatic in maintaining a desired temperature in a given room or space.

Our device, which is illustrated in the drawings as a car heater with a maximum capacity of 10,000 B. t. u., is designed to heat or cool cars, buildings, or other enclosed spaces thru mechanical agencies.

By this method and means we are able to take energy of a low grade, as by extracting heat from the outside air in the winter time, and by addition of a comparatively small amount of heat in the form of work, make available as high grade energy or heat, not only the energy added as work, but the low grade energy absorbed from the outside air. Under favorable circumstances, we can show marked economy over present heating methods.

In street car heating for instance, where the work is generally done by electricity, our system will save approximately 60% of the energy now expended in such heat.

While the showing is not so favorable in house heating, in comparison with coal at the present rates, and with electrical power at the ordinary rate, we believe that inasmuch as such a service would provide a source of constant load, which would be highly advantageous to the power companies, a special rate could be profitably allowed, such that the system would compete with coal, and of course if the cost were even approximately the same as that of coal, it would be much more desirable on account of the elimination of all care, dirt and inconveniences.

The principle on which the temperature maintainer works is precisely the same as that of the compression refrigerating machine, that is, it depends upon the facts that the temperature at which a substance boils varies with the pressure and that in being transformed from a liquid to a gas, or vice versa, a certain amount of latent heat is added or rejected, as the case may be.

The cycle employed utilizes these phenomena as follows: Liquid at a low temperature and pressure is allowed to absorb heat of a low grade from the atmosphere. As it vaporizes, the vapor is drawn off, maintaining the low pressure. This vapor is then compressed to a higher pressure and the latent heat absorbed at a low pressure and temperature, plus the work done by the compressor, which is present in the form of heat, is then rejected thru a second coil to the space to be heated at a higher temperature, the liquid condensing and this liquid is then returned to the original coil thru a suitable reducing valve.

It will be understood that each coil is at different times a hot coil and a cold coil, so that the term hot or cold coil can only be applied consistently with reference to the condition under which the system is operating at any particular time.

As shown in Figure 3, the hot coil 1 is connected to and the fluid circuit is toward the reducing valve 2, the fluid flowing thru the aperture 3, past the check valve 4, past the needle valve 5, through the tube 6 to the interior of the spring chamber 7, upwardly through the aperture 8, past the check 9 and out through the pipe 10 to the cold coil 11, from this coil thru the pipe 12 to the distributor valve 13, where it enters the port 14, passes thru the slide valve port 15 to the port 16, thence to the compressor 17, from the compressor thru pipes 18 and 19 to the chamber 20 of the distributing valve, from this chamber into port 21 and out thru port 22, over the pipe line 23 to the hot coil 1.

Looking now at the thermostat 24, it will be noted that the steel bar 25 is longer than the aluminum bar 26 and as the lever 27 is supported and controlled by the balls 28, 29 and 30 under the effect of the heavy compression spring 31, the lever 27 is held to its right hand position, as shown in Figure 3.

When the space, whose temperature is to be controlled, becomes too warm, the aluminum bar of the thermostat, which of course is positioned in the temperature that is to be controlled, becomes longer than the steel bar and the lever is swung about the ball 28, as a center, and the distributing valve then assumes the position shown in Figure 4. It will be noted that the circuit of the fluid thru the piping system and the reducer valve is then reversed and the coil 1 becomes the cold coil and the coil 11 becomes the hot coil.

It will be understood that the layout shown in Figures 3 and 4 are schematic and show how the means and system may be applied to meet any problem.

The particular embodiment of my invention shown in Figures 1 and 2, is an adaptation to street car heating. This unit is designed to be put in one corner or compartment of a street car with the coil 1 on the interior of the car and with the coil 11 below the floor line where it is exposed to the external atmosphere.

The unit consists essentially of a motor 31, suitably housed and driving by means of the belt 32, a compressor 17 and the hot and cold coils assembled, as shown with the thermostat 24 mounted on the top of the compressor and with the reducing valve 2 mounted on the motor housing.

It will be noted that the circulating system is assembled so as to eliminate practically all stuffing boxes, substantially all of the joints being made with gaskets and as a matter of fact, the only stuffing box required being the stuffing box 33 for one end of the compressor crank shaft.

It will be noted that the motor 31 not only drives the compressor, but also drives the fan 34 and this fan draws air thru the inlet opening 35 from whence it passes thru the throat 36 of the coil 1 outwardly in the direction of the arrows, beyond the baffle plate 37, downwardly and inwardly thru the central aperture of the baffle plate 38, outwardly again beyond the baffle plate 39, downwardly and inwardly and out thru the throat 40 in the motor housing from whence it is drawn by the fan 34.

Thus in the case of a street car warmed by this unit, the discharged warm air near the floor of the car, would of course rise as it spreads out thru the interior of the car, although it is of course obvious that the direction of the flow of air could be reversed and the warm air discharged thru the opening 35, if desired.

In the unit shown, it is proposed to use sulphur dioxide as a medium because of its pressure-temperature relation and because it is a lubricant, which may be introduced into the crank case of the compressor, thus eliminating the necessity of interior lubrication attention, although of course it is understood that any thermodynamic medium can be used in place of sulphur dioxide.

In Figure 5 I have shown an example of the uses of the heat entropy diagram for sulphur dioxide.

Assuming that the conditions are such that the $SO_2$ in the outside coil, that is coil 11, is at zero degrees (0°) and that in the inside coil is at 100° F., and then we have the cycle A B C D as shown. Starting at A we have the medium as it comes from the reducing valve, mostly liquid, with a heat content of 27 B. t. u./lb. As it absorbs heat it vaporizes going from A to B where it is 89% vapor, still at 0° with a heat content of 151.5 B. t. u., having absorbed 124.5 B. t. u./lb. at 0° F. from the outside atmosphere. From there the compressor takes and compresses it adiabatically from B to C, discharging to the inside coil at C with heat content of 185 B. t. u./lb. available at 100° F., whereas the compressor only puts in as work 33.5 B. t. u./lb.

It then condenses at a constant temperature of 100° F. from all vapor at C to all liquid at D, giving up its latent heat of 185−27 or 158 B. t. u./lb.

In the expansion thru the reducing valve, no work is done on or by the medium, so the heat content remains the same. The temperature, however, falls and a small part vaporizes absorbing as latent heat the heat given up by rest in cooling. This expansion is represented by DA.

It will be seen that the co-efficient of performance works out as follows:

Heat absorbed outside_____ 124.5 B. t. u./lb.
Work done _____ 33.5 B. t. u./lb.
Heat rejected inside_____ 158.0 B. t. u./lb.

$$\text{Ratio}\left\{\frac{\text{Heating effect}}{\text{Work done}}\right\} \text{Co-efficient of performance}\ldots\ 4.72$$

While we have shown and illustrated our invention in one particular physical embodiment and as one particular sequence and combination of operations, we do not wish it understood that we limit ourselves to these particular disclosures, as it is evident that the invention may be varied in many ways within the scope of the following claims.

Claims:

1. Means for maintaining a pre-determined temperature comprising two heat transferring devices, one positioned within a space to be heated or cooled and the other outside of said space, means for causing either one of said devices to reject heat picked up by the other of said devices and means actuated by the temperature within the space to be heated or cooled for determining whether the device in said space shall pick up or reject heat.

2. In means for maintaining a pre-determined temperature with a space to be heated or cooled, the combination of two heat transferring coils, one positioned within said space and the other positioned outside of said space, a distributor valve for determining which of said coils shall reject heat and which take up heat and thermostatic means for actuating said distributor valve.

3. In means for maintaining a pre-determined temperature within a given space, the combination with two heat transfer coils one positioned within said space and the other without said space, of a distributing valve and a thermostat, said thermostat acting to determine which of said coils will be the hot coil and which will be the cold coil in the heat transferring system.

4. In a temperature maintainer, the combination of a compressor, a motor for driving said compressor, a heat transfer coil positioned below said motor and adapted to be exposed outside of the space to be heated or cooled, a heat transfer coil positioned above said motor and below said compressor and adapted to be positioned within the space to be heated or cooled, connections for circulating a fluid thru said coils and said compressor and a fan driven by said motor and adapted to circulate air thru said interior coil to warm or cool the space to be heated.

5. In a temperature maintainer, the combination of a compressor, a motor for driving said compressor, a fan driven by said motor, a heat transfer coil adapted to be positioned outside of the space to be heated or cooled, a second heat transfer coil adapted to be positioned within the space to be heated or cooled, an air circulating system including the space around the coils of said second coil and a discharge opening into the space to be heated or cooled, a discharge valve and a fluid circulating system including said two coils, compressor and discharge valve, and means actuated by the temperature within the space to be heated for actuating said discharge valve, thereby determining when said inside coil shall act as a hot coil with said outside coil as a cold coil, and vice versa.

6. The method of maintaining a pre-determined temperature within a given space, comprising the circulating of air thru heat transfer means within said space and controlling said heat transfer means as to its relative temperature with regard to the interior of said space to be heated by means determined by the temperature within the space to be heated.

7. The method of maintaining a pre-determined temperature within a given space, comprising the circulation of a thermodynamic medium thru two heat transfer means, one positioned within the space to be heated and the other without the space to be heated, transferring heat from one of said means to the other of said means thru the medium of said thermodynamic medium and controlling the relative temperature of the heat transfer means within said space with respect to the temperature within said space by means actuated by the temperature within said space.

CHARLES A. STICKNEY.
ALPHEUS B. STICKNEY.